(12) United States Patent
Egawa

(10) Patent No.: US 7,813,063 B2
(45) Date of Patent: Oct. 12, 2010

(54) DRIVING UNIT AND OPTICAL PICK-UP DEVICE INCLUDING THE SAME

(75) Inventor: Tomohiro Egawa, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 0 days.

(21) Appl. No.: 12/504,536

(22) Filed: Jul. 16, 2009

(65) Prior Publication Data

US 2010/0027140 A1 Feb. 4, 2010

(30) Foreign Application Priority Data

Aug. 1, 2008 (JP) ............................. 2008-199840

(51) Int. Cl.
*G02B 15/14* (2006.01)
*G02B 7/02* (2006.01)

(52) U.S. Cl. ...................................... 359/824; 359/694

(58) Field of Classification Search ......... 359/694–701, 359/811–824; 310/311, 320; 369/44.11, 369/44.14; 396/79, 89, 133
See application file for complete search history.

(56) References Cited

U.S. PATENT DOCUMENTS 4,303,324 A * 12/1981 Marcus ........................ 396/133
5,150,260 A * 9/1992 Chigira ........................ 359/694
5,225,941 A 7/1993 Saito et al. .................. 359/824
2003/0052573 A1 3/2003 Wischnewskiy

FOREIGN PATENT DOCUMENTS

| JP | 4-69070 | 3/1992 |
|----|---------|--------|
| JP | 2003-45068 | 2/2003 |
| JP | 2008-96931 | 4/2008 |
| JP | 2008-96932 | 4/2008 |
| WO | WO-2007/063359 | 6/2007 |
| WO | WO-2008/047782 | 4/2008 |

* cited by examiner

*Primary Examiner*—Mohammed Hasan
(74) *Attorney, Agent, or Firm*—Morrison & Foerster LLP

(57) ABSTRACT

The present invention relates to a driving unit capable of implementing a long stroke drive while achieving height reduction of the driving unit. The driving unit is provided with a driving mechanism for driving a driven body. The driving mechanism includes: a bendable displaceable member that is fixated at one end and, through electric control, bent and displaced at the other end; a driving direction-changing member changing a direction of the bending and displacement of the bendable displaceable member to a driving direction of the driven body, the driving direction of the driven body being perpendicular to the direction of the bendable displaceable member; a contact member frictionally engaged with the driving direction-changing member and driving the driven body; and a precompression member mounted in the driven body and precompressing the contact member towards the driving direction-changing member.

14 Claims, 8 Drawing Sheets

DRIVING UNIT AND OPTICAL PICK-UP DEVICE INCLUDING THE SAME

This Nonprovisional application claims priority under 35 U.S.C. §119(a) on Patent Application No. 2008-199840 filed in Japan on Aug. 1, 2008, the entire contents of which are hereby incorporated by reference.

TECHNICAL FIELD

The present invention relates to a driving unit provided with a bendable displaceable member that is fixated at one end, and, through electric control, bent and displaced at the other end, and to an optical pick-up device including the driving unit.

BACKGROUND ART

Recently, optical recording/reproducing devices capable of recording and reproducing optical information on optical storage media such as BD (Blu-ray) Disks include optical heads capable of correcting spherical aberrations which occur when an optical beam passes on a recording surface of each of the optical media. An example of such optical heads can be seen in a conventional technology disclosed in Patent Literature 1 (Japanese Patent Application Publication, Tokukai, No. 2003-45068; Publication date: Feb. 14, 2003).

In a spherical aberration correction technique using the above-described optical heads, a core of a characteristic configuration is that a cluster of relay lenses movable along an optical axis is provided. The following specifically explains driving of the cluster of relay lenses. The cluster of relay lenses is held by a lens holder. The lens holder is driven along a guide rail, in connection with rotational movement of a lead screw connected to a stepping motor.

An example of such a driving technology in the field of optics can be seen in a driving unit disclosed in Patent Literature 2 (Japanese Patent Application Publication, Tokukaihei, No. 4-69070; Publication date: Mar. 4, 1992).

Patent Literature 2 discloses an invention related to a driving unit provided with a piezoelectric element expandable and contractible in a driving direction of a lens barrel (an optical axis direction) and a driving direction-changing member connected to one end of the piezoelectric element. FIG. 10 is a diagram illustrating a configuration of the driving unit disclosed in Patent Literature 2. As shown in FIG. 10, the driving unit according to Patent Literature 2 is provided with a piezoelectric element 301, a rod-shaped driving direction-changing member 302, a lens barrel (driven body) 304, a lens 3011, an image pickup device 3012 such as a CCD, and a circuit substrate 3013, all of which are held inside a housing 306. The piezoelectric element 301 is connected to one end of the rod-shaped driving direction-changing member 302, and the lens barrel (driven body) 304 and the driving direction-changing member 302 are frictionally engaged. Further, the lens 3011 is mounted in the lens barrel 304, while the image pickup device 3012 is positioned below the lens barrel 304. The image pickup device 3012 is fixed to the circuit substrate 3013 by, for example, soldering. According to Patent Literature 2, because the driving direction-changing member 302 is frictionally engaged with the lens barrel 304 (driven body), a frictional force occurs between the driving direction-changing member 302 and the lens barrel 304 when the piezoelectric element 301 connected to the driving direction-changing member 302 expands or contracts itself in the optical axis direction. This frictional force drives the lens barrel 304 along the optical axis.

In the driving unit shown on FIG. 10, due to the expansion and contraction of the piezoelectric element 301 in directions of arrows, the driving direction-changing member 302 is driven in the direction of the optical axis. As a result, the lens barrel 304 frictionally engaged with the driving direction-changing member 302 is driven in the optical axis direction.

However, the above-described conventional technology raises the following problems.

In the case of the conventional technology disclosed in Patent Literature 1, it is difficult to achieve height reduction for the device while a high level of correcting ability is maintained for the cluster of relay lenses. The reason for this is that reducing the length of the lead screw for reduction of the height of the device also results in a decrease in a range in which the cluster of relay lenses corrects the spherical aberration. In other words, the height reduction of the optical head device is difficult in the case of the conventional technology where the correcting ability of the cluster of relay lenses is ultimately limited by the length of the lead screw.

Further, in the case of the conventional technology disclosed in Patent Literature 2, height reduction is difficult to achieve in a configuration where the expansion or contraction direction of the piezoelectric element 301 is identical with the driving direction of the lens barrel 304. Further, miniaturization can only be achieved by miniaturizing the driving unit composed of the piezoelectric element 301 and the driving direction-changing member 302. When the piezoelectric element 301 is miniaturized, a displacement amount and a thrust decrease. This decreases a driving speed. Further, when the driving direction-changing member 302 is miniaturized, a driving stroke decreases.

SUMMARY OF INVENTION

Technical Problem

The present invention is attained in view of the above-described problems. An object of the present invention is to provide a driving unit capable of achieving a long stroke drive as well as achieving height reduction.

In order to solve the problems described above, the driving unit of the present invention is provided with a driving mechanism for driving a driven body. The driving device is provided with a bendable displaceable member fixated at one end and, through electric control, bent and displaced at the other end, with a driving direction-changing member changing a direction of the bending and displacement of the bendable displaceable member to a driving direction of the driven body, the driving direction of the driven body being perpendicular to the direction of the bendable displaceable member, with a contact member frictionally engaged with the driving direction-changing member and driving the driven body, and with a precompression member mounted in the driven body and carrying out precompression on the contact member towards the driving direction-changing member.

In this configuration, when the bending and displacement of the bendable displaceable member is excited through electric control, the driving direction-changing member connected to the bendable displaceable member is bent as well, and deformation such as distortion or flexure of the bendable displaceable member occurs. The driving direction-changing member where the deformation (e.g., distortion or flexure) has occurred then moves along a direction perpendicular to the direction of the bending and displacement for restoration of a shape of the bendable displaceable member. The driving force caused by the shape-restoring movement of the driving direction-changing member is transmitted to the driven body through the contact member, and the driven body is driven along a direction different from the direction of the bending and displacement. In other words, the driving direction-changing member functions as means to transmit to the driven body the driving force caused by the bending and displacement of the bendable displaceable member, and at the same time functions as means to change the driving direction.

Because a driving unit according to conventional technology is configured so that a direction of contraction or expansion of the piezoelectric member used as a drive source is identical to a driving direction of a driven body, it is necessary to consider a sum of a dimension in a driving direction of the driven body and a dimension in a driving direction of the piezoelectric member, when a dimension of the driving unit in the driving direction is determined. Therefore, it is difficult to reduce a height of a driving device in the driving unit according to the conventional technology. Further, even if height reduction were achieved, a displacement amount and a thrust of a piezoelectric element would decrease. This would inevitably cause deterioration in driving performance, for example, a decrease in a driving speed or a diminution of a driving stroke.

However, with the configuration of the present invention described above, the aforementioned problems in the conventional technology do not occur. In other words, according to the present invention, because the direction of the driving force caused by the bending and displacement of the bendable displaceable member is changed by the driving direction-changing member, the driven body is driven along a direction different from that of the bending and displacement of the bendable displaceable member. Because the driving direction of the driven body is different from the direction of the bending and displacement of the bendable displaceable member as a drive source, only a dimension in the driving direction of the bendable displaceable member needs to be considered when a dimension in the driving direction of the driving unit is determined. Therefore, in regard to the above-described configuration, in comparison to a conventional driving unit, it becomes possible to design the driving unit so that a dimension in the driving direction of the driving unit becomes smaller, thereby reducing the height of the driving unit. Further, because the driving direction-changing member and the precompression member mounted in the driven body are configured so as to be in contact with the contact member, it is possible to equalize the precompression before, during and after the driving. As a result, a long stroke drive can be achieved while height reduction can be achieved.

The driving unit according to the present invention includes: the driving direction-changing member changing the direction of the bending and displacement of the bendable and displaceable member to the driving direction in which the driven body is driven and which is perpendicular to the direction of the bending and displacement; the contact member frictionally engaged with the driving direction-changing member and driving the driven body; and the precompression member mounted in the driven body and precompressing the contact member towards the driving direction-changing member. As a result, the driving direction-changing member and the precompression member are both in contact with the contact member. This makes it possible to equalize the precompression before, during and after the driving. Further, a long stroke drive can be achieved while height reduction can be achieved.

For a fuller understanding of the nature and advantages of the invention, reference should be made to the ensuing detailed description taken in conjunction with the accompanying drawings.

BRIEF DESCRIPTION OF DRAWINGS

FIG. 3(a) is a plan view, and FIG. 3(b) is a side view. FIG. 3(c) shows a state of bending and displacement of the piezoelectric element.

FIG. 5(a) shows an example where the driving direction-changing member has a U-shaped bottom and FIG. 5(b) shows an example where the driving direction-changing member has an L-shaped bottom.

FIG. 6(a) shows a moving direction and an attitude of the driving direction-changing member at the time when the bendable displaceable member is bent and displaced towards the driving direction-changing member. FIG. 6(b) shows the attitude of the driving direction-changing member at the time when the bendable displaceable member is in a neutral position. FIG. 6(c) shows the operative direction and the attitude of the driving direction-changing member at the time when the bendable displaceable member is bent and displaced in a direction opposite to the driving direction-changing member.

FIG. 7(a) shows the operations of the contact member and of a driving direction-changing member including a curved surface curved with respect to only a single axis. FIG. 7(b) shows the operations of the contact member and of a driving direction-changing member having a hemispherical surface.

FIG. 8(a) shows an analog waveform and FIG. 8(b) shows a pulse waveform.

DESCRIPTION OF EMBODIMENTS

An embodiment of the present invention can be explained as follows with reference to FIGS. 1 to 9.

A driving unit of the present invention is provided with a bendable displaceable member and a control means to electrically control bending and displacement of the bendable displaceable member. In other words, in the driving unit, the bending and displacement of the bendable displaceable member is excited through the control by the electric control means, and a driving force incurred by the bending and displacement is a power source of the driving unit. "Control means" refers to a section provided with a driving circuit 8 explained later and an upper control circuit of the driving circuit 8. For simplification of the explanation, the member whose bending and displacement is excited through electric control will below be referred to as a "bendable displaceable member".

Figure 1:
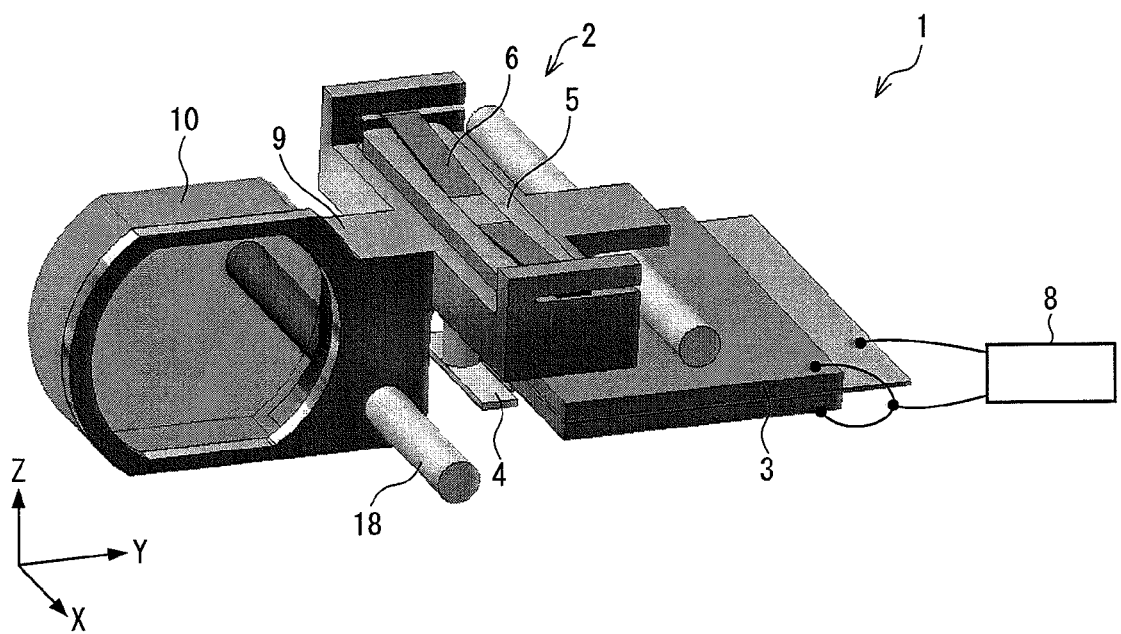
FIG. 1 is a perspective view of a configuration of a driving unit in accordance with a present embodiment.
Figure 2:
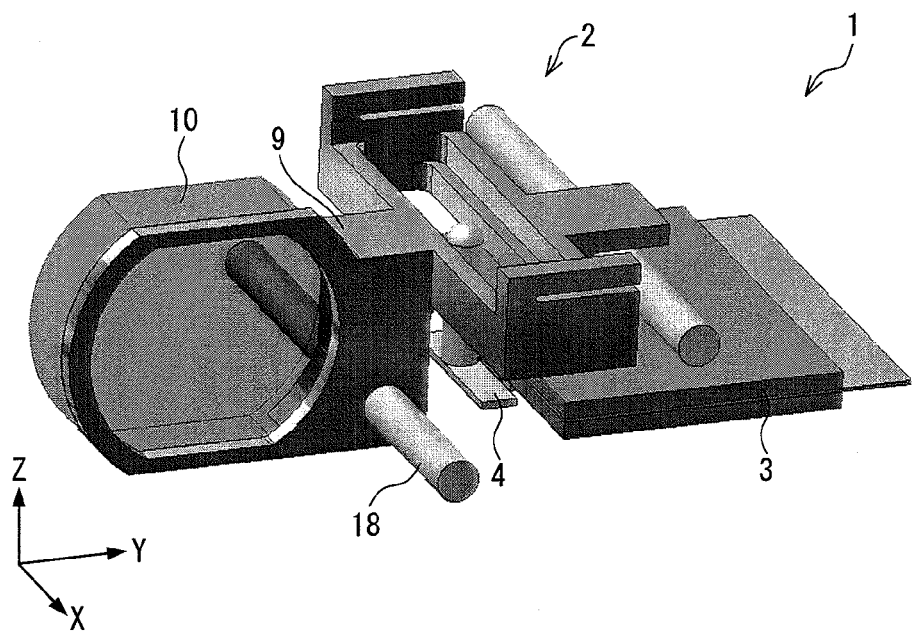
FIG. 2 is a perspective view of the configuration of the driving unit from which a contact member and a precompression member is removed.
Figure 3:
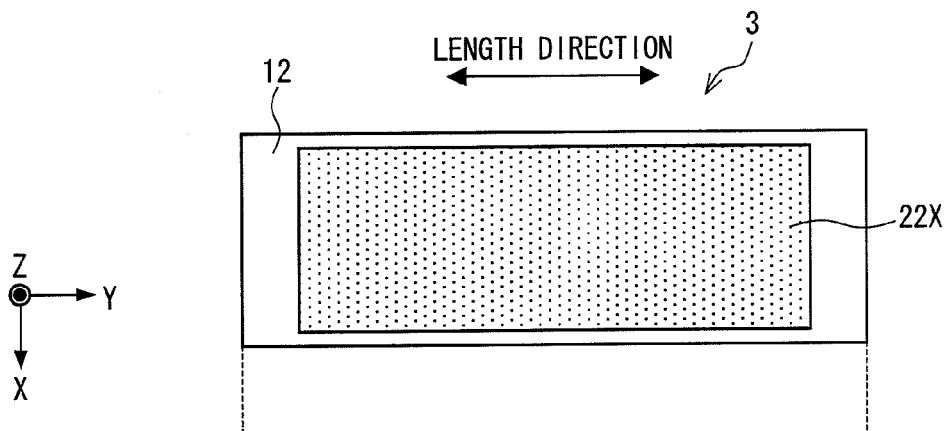
FIGS. 3(a) to 3(c) show a configuration of a bimorph piezoelectric element provided in the driving unit.
Figure 3:
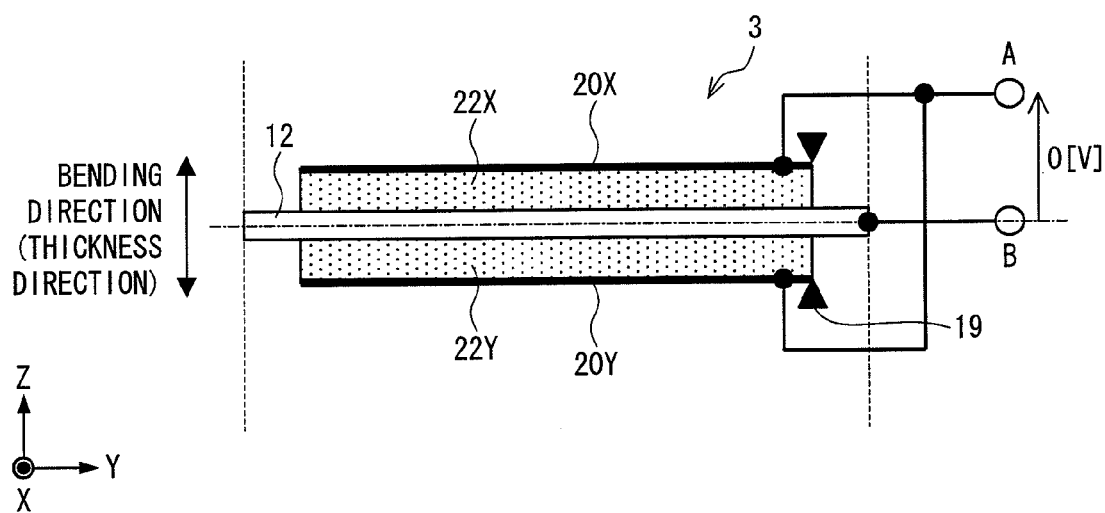
Figure 3:
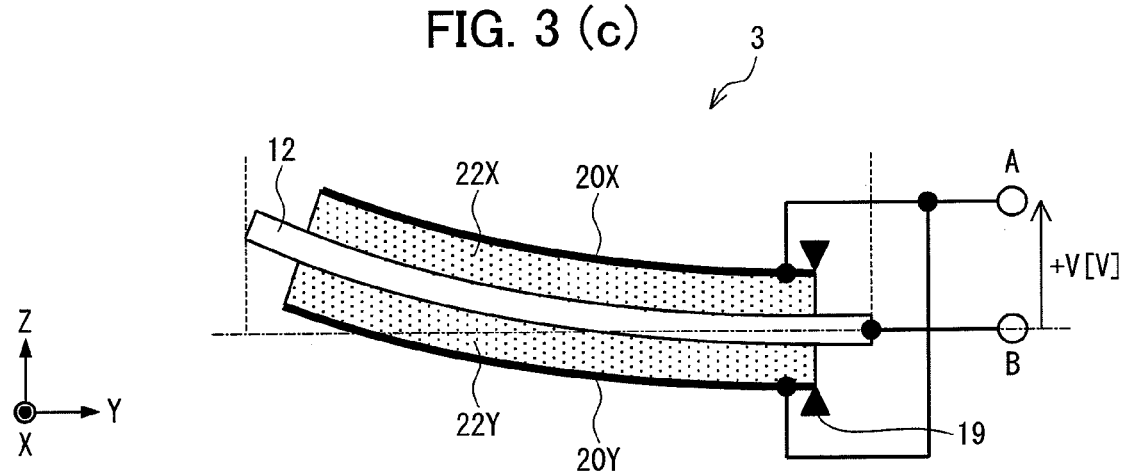

FIG. 1 is a perspective view of a configuration of a driving unit 1 in accordance with the present embodiment, and FIG. 2 is a perspective view of the configuration of the driving unit 1 from which a contact member 5 and a precompression member 6 are removed. The driving unit 1 is provided with a driving mechanism 2 that drives a driven body 9 along a sliding axis 18. The driving mechanism 2 includes a bendable displaceable member 3. One end of the bendable displaceable member 3 is fixated while the other end is bent and displaced through electric control.

One example of the bendable displaceable member 3 is a piezoelectric element having a bimorph structure as shown in FIGS. 3(a) to 3(c). The following specifically explains excitation of the bending and displacement of the bendable displaceable member 3 through electric control, with reference to FIG. 3(a) to FIG. 3(c).

FIGS. 3(a) to 3(c) show a configuration of a bimorph piezoelectric element forming the bendable displaceable member 3. FIG. 3(a) is a plan view, and FIG. 3(b) is a side view. FIG. 3(c) shows a state of the bending and displacement of the piezoelectric element.

The piezoelectric element (bendable displaceable member 3) shown in FIGS. 3(a) to 3(c) includes two piezoelectric material layers 22X and 22Y and a shim member 12 made of metal. The piezoelectric element has a crimped three-layer structure in which the shim member 12 is sandwiched between the two piezoelectric material layers 22X and 22Y. Further, the three-layer structure is sandwiched between two electrodes 20X and 20Y. The two electrodes 20X and 20Y are connected to control means (not shown). Further, either one end of the shim member 12 or one end of each of the two piezoelectric material layers 22X and 22Y is fixed to and supported at a fixation point 19. In FIGS. 3(a) to 3(c), a laminating direction of the three-layer structure composed of the piezoelectric material layers 22X and 22Y and the shim member 12 is assumed to be a thickness direction, while in the plan view shown in FIG. 3(a), a longitudinal direction of the piezoelectric element is assumed to be a length direction. Further, in the thickness direction, a side X of the piezoelectric material layer 22X is assumed to be an X side, and a side Y of the piezoelectric material layer 22Y is assumed to be a Y side.

In the piezoelectric element shown in FIGS. 3(a) and 3(b), when a voltage is applied by the control means to the electrodes 20X and 20Y, the piezoelectric element is bent and displaced in the thickness direction.

For example, the piezoelectric material layer 22X is polarized so as to contract at a time when a voltage between the electrode 20X and the shim member 12 is positive and so as to expand at a time when the voltage between the electrode 20X and the shim element 12 is negative. Further, the piezoelectric material substrate 22Y is polarized so as to expand at a time when the voltage between the electrode 20Y and the shim element 12 is positive and so as to contract at a time when the voltage between the electrode 20Y and the shim element 12 is negative.

The following explains a case where a voltage is applied by the control means to the piezoelectric material layers 22X and 22Y polarized as described above. As shown in FIG. 3(c), the control means applies a positive voltage between the shim element 12 and each of the electrodes 20X and 20Y (between A and B in FIG. 3(c)). Further, the two piezoelectric material layers 22X and 22Y are fixated at the fixation points 19, that are indicated by black triangles. In this case, as shown in FIG. 3(c), the piezoelectric element is bent and displaced in the thickness direction on the X side. On the other hand, though not shown, when the control means applies a negative voltage between A and B, the piezoelectric element is bent and displaced in the thickness direction on the Y side.

In this way, the piezoelectric element shown in FIGS. 3(a) to 3(c) is arranged so as to bend and be displaced at the time when a voltage is applied by the control means. The bendable displaceable member provided in the driving device of the present invention is not limited to the piezoelectric element shown in FIGS. 3(a) to 3(c), as long as the bendable displaceable member has a configuration that makes it possible to electrically control the bending and displacement. One example of such a bendable displacement member is a monomorph piezoelectric element composed of one piezoelectric material layer and a shim member. Such a monomorph piezoelectric element has a similar operation concept to that of the bimorph piezoelectric element, and makes it possible to electrically control the bending and displacement.

The bendable displaceable member provided in the driving device of the present embodiment refers to a member that is bent and displaced through electric control (for example, by applying a voltage), as described above. A structure of the bendable displaceable member should not be specifically limited. Further, dimensions such as thickness, length, and width, and a shape are not to be specifically limited.

The driving mechanism 2 is provided with a driving direction-changing member 4. The driving direction-changing member 4 changes a direction of the bending and displacement of the bendable displaceable member 3 into a driving direction (direction of an X axis) in which the driven body 9 is driven. This driving direction is parallel to a direction of the sliding axis 18 perpendicular to the direction of the bending and displacement.

Figure 4:
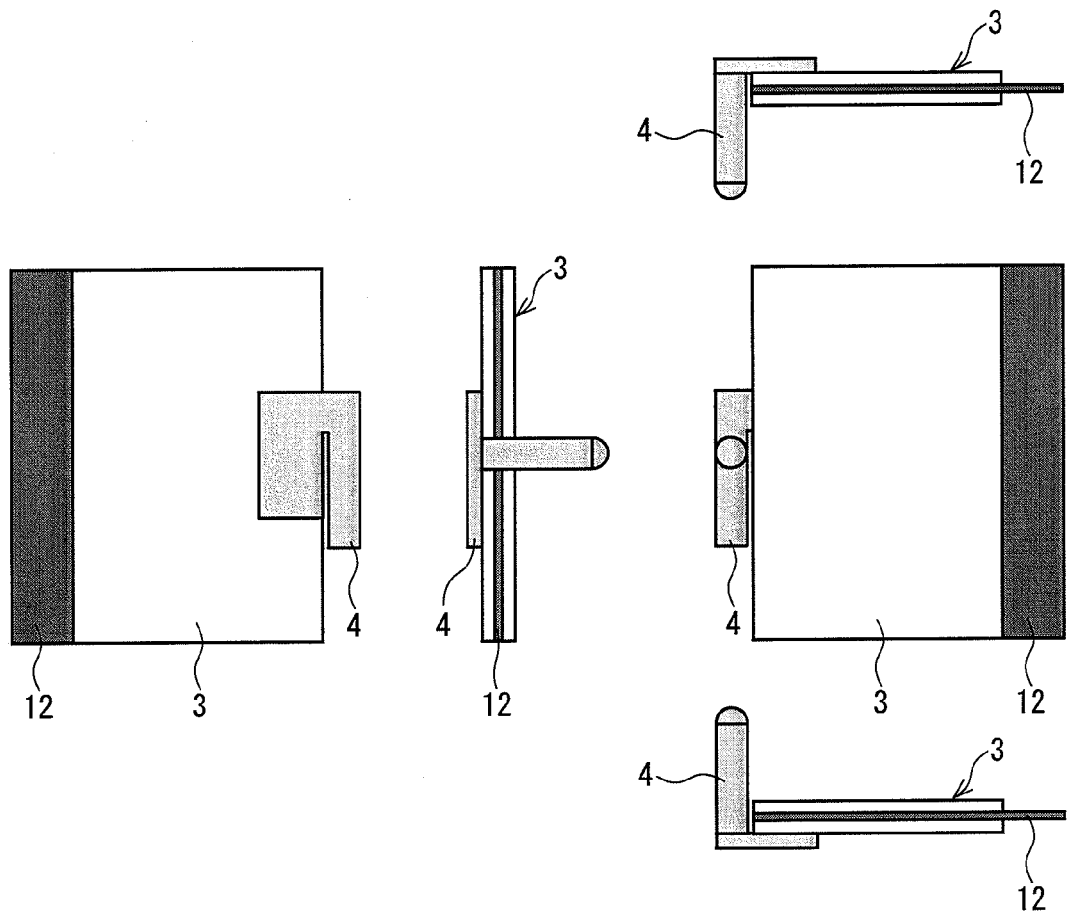
FIG. 4 is an explanatory view of the configuration of a driving direction-changing member provided in the driving unit.

FIG. 4 is an explanatory view of a configuration of the driving direction-changing member 4. FIGS. 5(a) and 5(b) are bottom views of the driving direction-changing member 4. FIG. 5(a) shows an example where the driving direction-changing member 4 has a U-shaped bottom surface and FIG. 5(b) shows an example where the driving direction-changing member 4 has an L-shaped bottom surface.

The driving direction-changing member 4 includes a bottom section having a U-shaped bottom surface, as shown in FIG. 5(a), and a substantially cylindrical protruding section provided so as to be upright from the bottom section. A tip of the protruding section is formed to be hemispherical. In the present driving unit 1, the bottom section of the driving direction-changing member 4 is bonded and fixed to a side of the bendable displaceable member 3 (the side in a −Z direction).

The driving mechanism 2 is provided with a contact member 5. The contact member 5 is frictionally engaged with the substantially cylindrical protruding section of the driving direction-changing member 4 and drives the driven body 9. The contact member 5 is mounted in the driven body 9.

The driving mechanism 2 includes the precompression member 6. The precompression member 6 precompresses the contact member 5 in a direction toward the driving direction-changing member 4. The compression member 6 attached to the driven body 9 is in contact with the contact member 5. The tip of the driving direction-changing member 4 is in contact with the contact member 5. Through friction produced at contact sections of the above members, the driven body 9 is driven along the sliding axis 18.

As shown in FIG. 3(c), the bendable displaceable member 3 is a bimorph piezoelectric element that is composed of a crimped three-layer structure in which the shim member 12 is sandwiched between the two aforementioned piezoelectric material layers 22X and 22Y. One end of the bendable displaceable member 3 is fixated by a fixating member (not shown). Further, the driving direction-changing member 4 is bonded and fixed to the bendable displaceable member 3. In the case that a fixation section between the bendable displaceable member 3 and the driving direction-changing member 4 includes a point where a displacement amount of the bendable displaceable member 3 is maximal, a displacement amount of the driving direction-changing member 4 also may be maximal.

Figure 5:
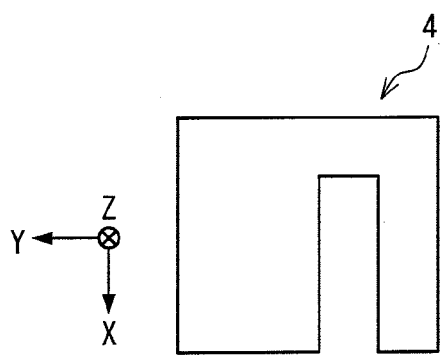
FIGS. 5(a) and 5(b) are bottom views of the driving direction-changing member.
Figure 5:
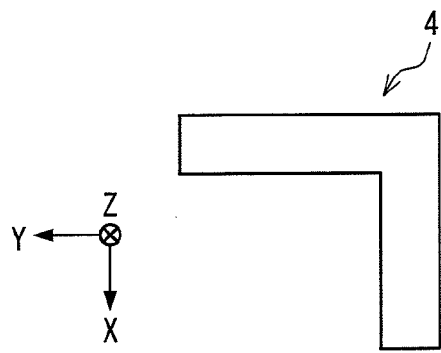

As shown in FIG. 5(*a*) and FIG. 5(*b*), the driving direction-changing member 4 is made of a material having a relatively low elasticity modulus, for example, metal, ceramic, or resin. The bottom section of the driving direction-changing member 4 is either U-shaped, as shown in FIG. 5(*a*), or L-shaped, as shown in FIG. 5(*b*). This shape makes it possible to change the driving direction of the bendable displaceable member 3.

Figure 6:
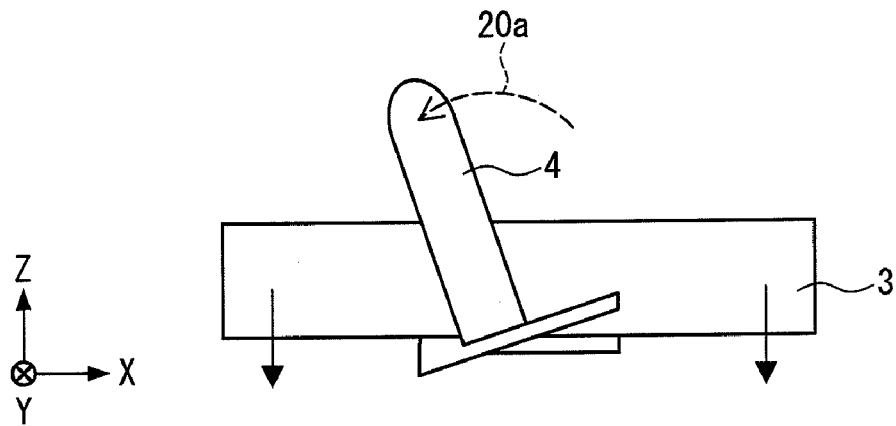
FIGS. 6(a) to 6(c) show an operation of the driving direction-changing member.
Figure 6:
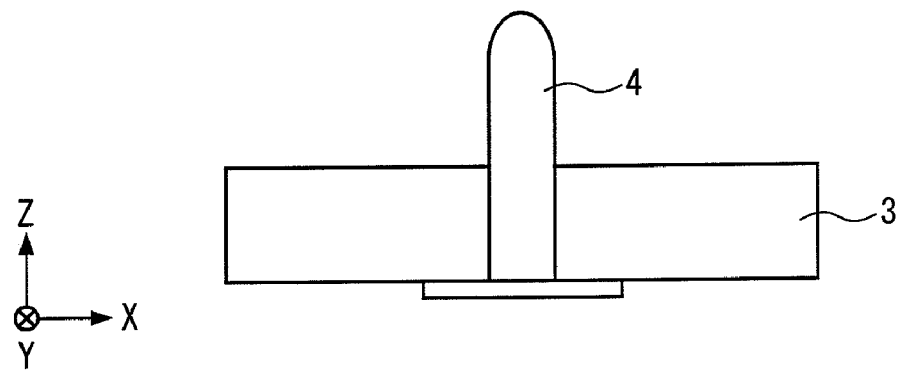
Figure 6:
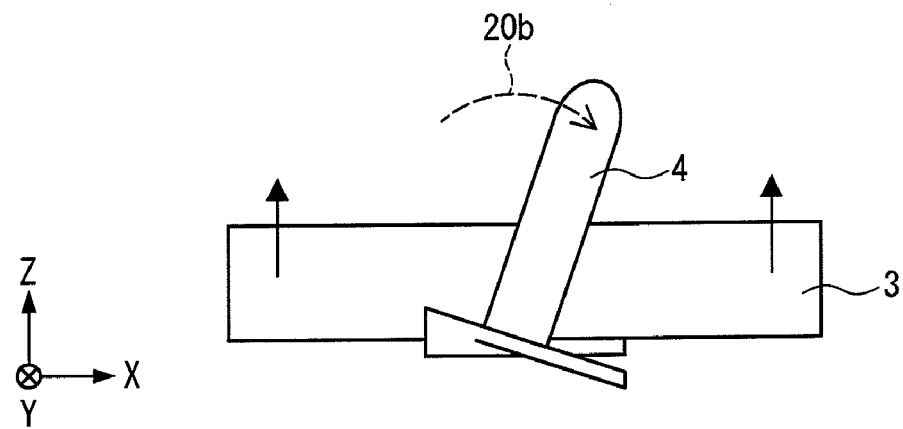

FIGS. 6(*a*) to 6(*c*) show an operation of the driving direction-changing member 4. FIG. 6(*a*) shows a moving direction and an attitude of the driving direction-changing member 4 at the time when the bendable displaceable member 3 is bent and displaced in a −Z direction. FIG. 6(*b*) shows the attitude of the driving direction-changing member 4 at the time when the bendable displaceable member 3 is in a neutral position. FIG. 6(*c*) shows the moving direction and the attitude of the driving direction-changing member 4 at the time when the bendable displaceable member 3 is bent and displaced in a +Z direction.

Due to the contact (frictional engagement) of the driving direction-changing member 4 with the contact member 5, the driven body 9 moves along an optical axis. In other words, as shown in FIGS. 6(*a*) to 6(*c*), the displacement of the bendable displaceable member 3 along the Z direction is converted by the driving direction-changing member 4 to a displacement along the X axis. In other words, as shown in FIG. 6(*c*), in the case where one end of the driving direction-changing member 4 is not fixated at all, the driving direction-changing member 4 is displaced in the +X direction when the bendable displaceable member 3 is displaced in the +Z direction. As shown in FIG. 6(*a*), when the bendable displaceable member 3 is displaced in the −Z direction, the driving direction-changing member 4 is displaced in the −X direction. Note that a contact section that is the tip of the cylindrical protruding section of the driving direction-changing member 4 in contact with the contact member 5 may be made of a material that is different from a material of other sections of the driving direction-changing member 4. The contact section in contact with the contact member 5 can be made of a material such as gold, ceramic, resin, or carbon. This material is selected depending on a desired friction coefficient of the contact section with the contact member 5.

Figure 7:
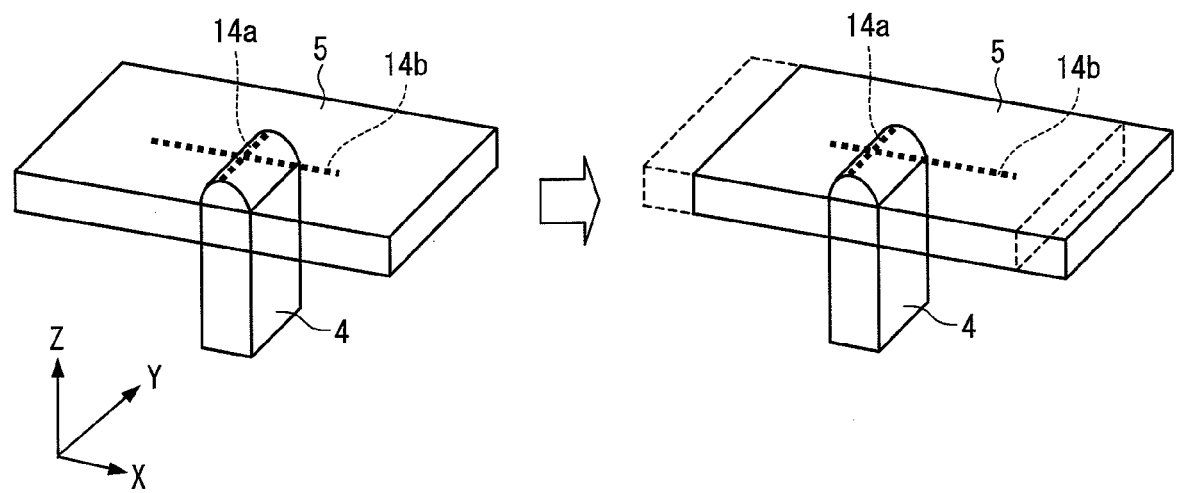
FIGS. 7(a) and 7(b) are explanatory views of operations of the driving direction-changing member and of a contact member.
Figure 7:
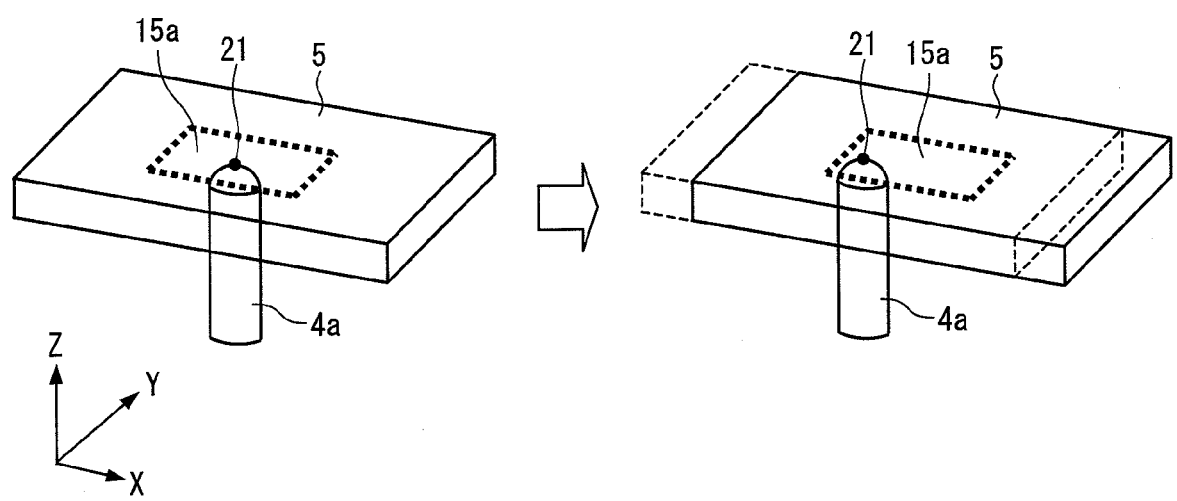
Figure 8:
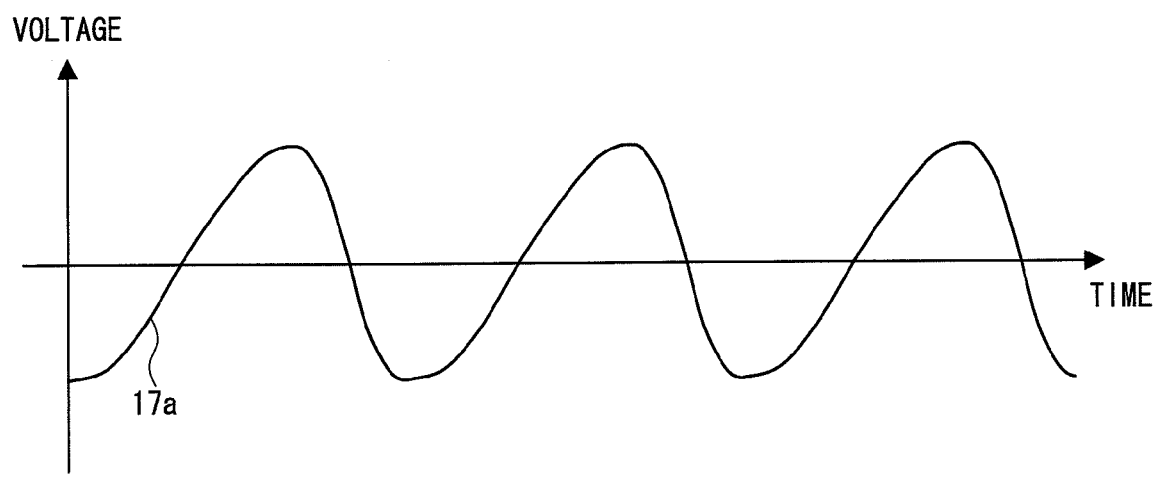
FIGS. 8(a) and 8(b) are charts showing examples of driving voltage waveforms each applied to the bendable displaceable member.
Figure 8:
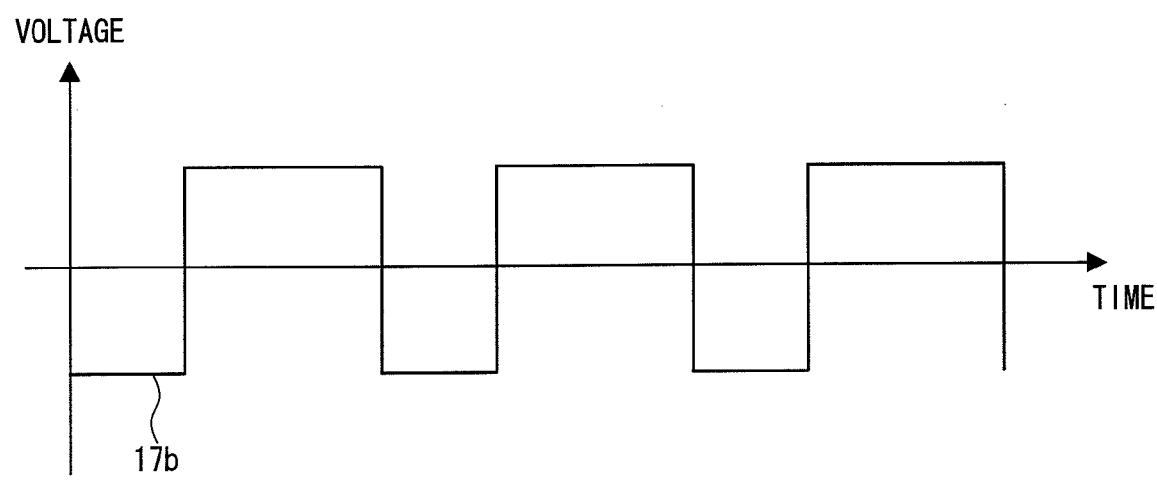

FIGS. 7(*a*) and 7(*b*) are explanatory views of operations of the driving direction-changing member 4 and the contact member 5. FIG. 7(*a*) shows the operations of the contact member 5 and a driving direction-changing member 4 including a curved surface curved only with respect to a direction of a single axis. FIG. 7(*b*) shows the operations of the contact element 5 and a driving direction-changing member 4*a* including a curved surface of a hemispherical shape.

FIGS. 7(*a*) and 7(*b*) show contact between the contact member 5 and the driving direction-changing member 4 and contact between the contact member 5 and the driving direction-changing member 4*a*. The contact section that is the tip of the driving direction-changing member 4 as shown in FIG. 7(*a*) has a curved surface, while the tip of the contact section of the driving direction-changing member 4*a* as shown on FIG. 7(*b*) is hemispherical. A section where the contact member 5 and the driving direction-changing member 4 or 4*a* are in contact with each other is shown by a dotted line. In FIG. 7(*a*), in the case where the curved surface of the tip of the driving direction-changing member 4 is curved around a Y axis, the contact between the contact member 5 and the driving direction-changing member 4 can be considered to be line contact shown by a contact line 14*a*. The contact line 14*a* is parallel to an XY surface. Further, by bringing the precompression member 6 into line contact along a contact line 14*b* with the contact member 5, the contact member 5 can be positioned along the Z direction. Further, it becomes possible to prevent rotation of the contact member 5. In this configuration, it is possible to equalize the precompression before, during and after the driving, and, as a result, to achieve a long stroke drive.

In the case that a tip of the contact section that is the tip of the driving direction-changing member 4 is hemispherical, as in FIG. 7(*b*), it becomes possible to position the contact member 5 along the Z direction, due to a point contact between the contact member 5 and the driving direction-changing member 4 at a contact point 21 and due to a surface contact between the precompression member 6 and the contact member 5 at a surface 15*a*. Further, it becomes possible to prevent the rotation of the contact member 5. In this configuration, it is possible to equalize the precompression before, during and after the driving, and therefore to achieve a long stroke drive.

The present driving unit 1 is provided with the sliding axis 18 guiding movement of the driven body 9 in the optical axis direction. The driven body 9 is provided with a hole section allowing the sliding axis 18 to pass through. The sliding axis 18 is a rod-shaped body that stretches along the optical axis and is fixated to a base (not shown). Further, the sliding axis 18 supports the driven body 9 so as to position the driven body 9 at a position where the driving direction-changing member 4 and the contact member 5 is in contact with each other (frictional engagement). In the present driving unit 1, the contact member 5 and the driven body 9 move along the sliding axis 18 in the direction of the optical axis, due to the frictional engagement between the driving direction-changing member 4 and the contact member 5. In the case of the present driving unit 1, the driven body 9 is not limited to a driven body formed integrally with the hole section allowing the sliding axis 18 to pass through. A hole member including the hole section may be separately provided and bonded to the driven body 9. Further, an optical component, such as a lens 10, is mounted in the driven body 9.

The bendable displaceable member 3 is connected to a driving circuit 8. The driving circuit 8 excites the bending and displacement of the bendable displaceable member 3 by applying, for example, a voltage to the bendable displaceable member 3. The driving circuit 8 is controlled by an upper control circuit (not shown) and applies to the bendable displaceable member 3 the voltage represented by a voltage waveforms 17*a* or 17*b* illustrated in FIG. 8(*a*) or 8(*b*). The voltage waveform can be either rectangular or pulse-shaped.

The electric control, by the control means, of the bending and displacement of the bendable displaceable member 3 is not limited to a control through voltage. For example, in a case where a bimetal or a shape memory alloy is used as the bendable displaceable member 3 and the bending and displacement is excited through heat, the electric control of the bending and displacement of the bendable displaceable member 3 becomes a control based on increase and decrease of an electric current. In this case, a temperature of the bendable displaceable member 3 is controlled by controlling, through the increase and decrease of the electric current flowing in the bendable displaceable member 3, heat generated by a part of the bendable displaceable member 3. Alternatively, the temperature of the bendable displaceable member 3 is controlled (i) by providing, in the vicinity of the bendable displaceable member 3, heat generating means that is made, for example, of a heat generating wire such as Nichrome™ or Kanthal™ and that generates heat through an electric current flow, and (ii) by controlling the heat generated by the heat generating means through the increase and decrease of the electric current flowing through the heat generating means. As a further alternative, for example, in a case where a magnetorestrictive element is used as the bendable displaceable member 3 and the bending and displacement of the bendable displaceable member 3 is excited through a magnetic field, a magnetic field-generating means, such as an electromagnet, generating a magnetic field through an electrical current flow is provided and the magnetic field applied to the bendable displaceable member 3 is controlled by controlling the increase and decrease of the electric current.

Figure 9:
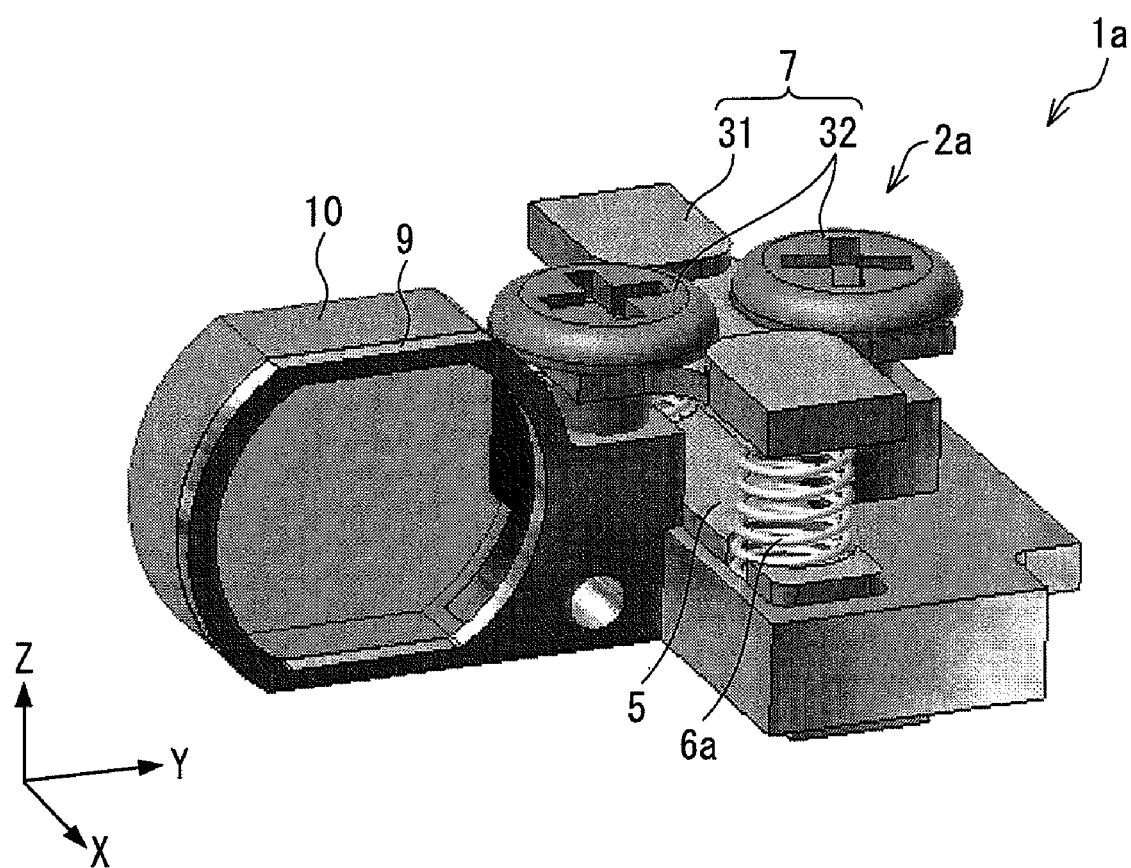
FIG. 9 is a perspective view of a configuration of a modified example of the driving unit in accordance with the present embodiment.
Figure 10:
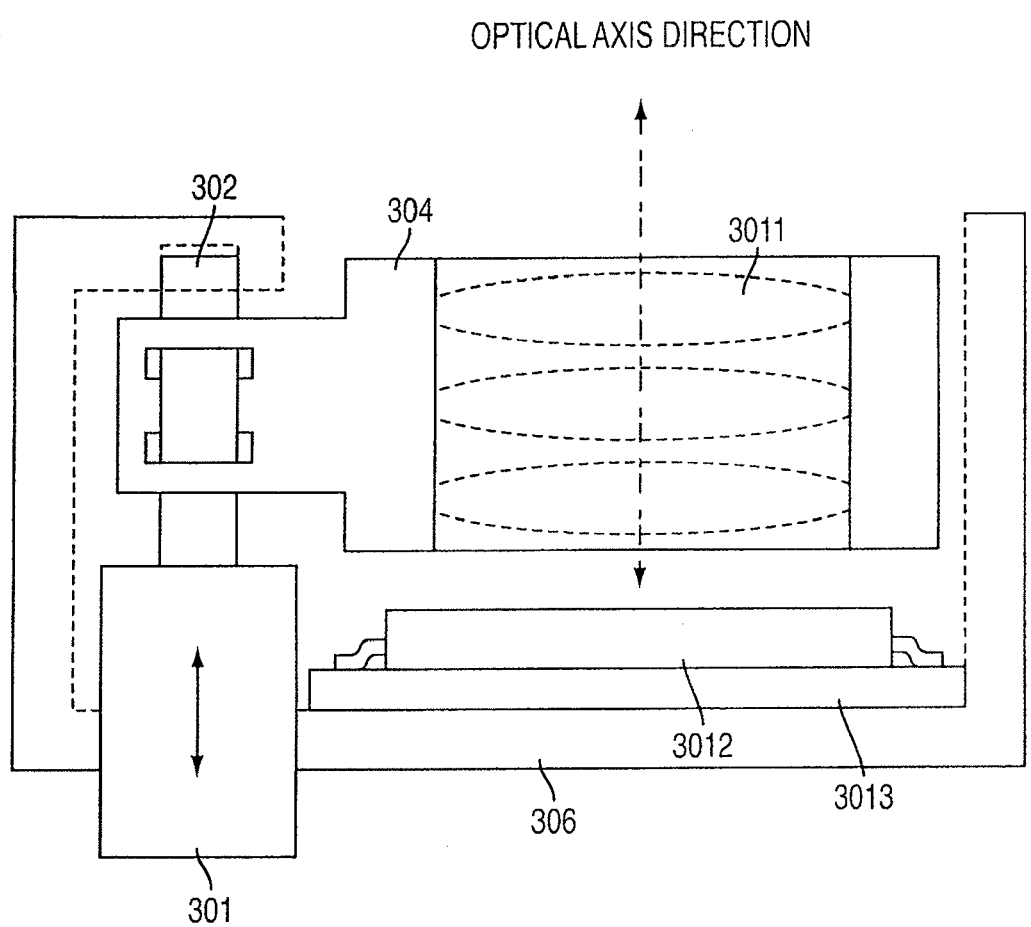
FIG. 10 is an explanatory view of a configuration of a conventional driving unit.

Further, as shown in FIG. 9, a mechanism to adjust the precompression may be provided. For example, a precompression retaining member 31 is fixated to the driven body 9 by using a screw 32. Then, it becomes possible to adjust a pressure of a precompression member including a compression spring 6a by adjusting the screw 32. The precompression retaining member 31 and the screw 32 compose a driving mechanism 7. In this configuration, the pressure of the precompression is applied to the contact member 5, and the tip of the driving direction-changing member 4 is positioned so as to be constantly in contact with the contact member 5.

Further, in the present driving unit 1, the bendable displaceable member 3 is described above as a bimorph piezoelectric element having a crimped three-layered structure in which two piezoelectric material layers 22X and 22Y are provided so as to sandwich a shim member 12. However, the bendable displaceable member 3 can also be configured to include a two-layered piezoelectric element where the two piezoelectric material layers are crimped to each other. In other words, the bendable displaceable member 3 provided on the present driving mechanism 2 can be configured as a so-called shim-less bimorph piezoelectric element that is configured by including two piezoelectric material layers and dispending a shim member. Further, the piezoelectric element may be configured by a piezoelectric layer in which a piezoelectric material layer has been formed.

As described above, the present driving unit 1 is provided with: a bendable displaceable member 3 which has one end fixated and whose bending and displacement is excited through electric control; and a driving direction changing member 4 fixated to the bendable displaceable member 3. Because the driving direction-changing member 4 and a precompression member 6 mounted in a driven body 9 are configured to be in contact with the contact member 5, it is possible to equalize the precompression before, during and after the driving. As a result, a long stroke drive can be achieved while height reduction can be achieved.

Further, in the driving unit according to the present invention, the driving direction-changing member is preferably configured so as to include a curved surface frictionally engaged with the contact member.

With this configuration, the driving direction-changing member and the contact member are constantly in contact with each other, thereby increasing stability of the driving device before, during and after driving.

In the driving unit according to the present invention, the curved surface of the driving direction-changing member is preferably curved with respect to only a single axis, and the precompression member is preferably in line contact with the contact member.

With this configuration, the contact between the driving direction-changing member and the contact member and the contact between the precompression member and the contact member are both line contacts, positioning of the driven body and prevention of rotation of the driven body become possible. Further, it is possible to accomplish uniform precompression during the driving.

In the driving unit according to the present invention, the single axis direction is preferably perpendicular to the driving direction of the driven body.

With this configuration, it is possible to have the uniform precompression during the driving.

In the driving unit according to the present invention, the curved surface of the driving direction-changing member is preferably hemispherical, and the precompression member is preferably in surface contact with the contact member.

With this configuration, due to the point contact between the driving direction-changing member and the contact member and due to the surface contact between the precompression member and the contact member, positioning of the driven body or prevention of rotation of the driven body becomes possible. Further, it is possible to have the uniform precompression during the driving.

The driving unit according to the present invention preferably further includes a precompression adjusting mechanism for adjusting the precompression carried out by the precompression member.

With this configuration, the driving unit can be constructed while the precompression is being adjusted. Further, driving conditions can be controlled by adjusting the precompression.

In the driving unit according to the present invention, a fixation section where the driving direction-changing member is fixated to the bendable displaceable member preferably includes a point where the displacement amount of the bendable displaceable member is maximal.

With this configuration, it is possible to maximize a displacement amount of the driving direction-changing member.

In the driving unit according to the present invention, it is preferable that a material of a contact section of the driving direction-changing member in contact with the contact member is identical to a material of other sections of the driving direction-changing member.

With this configuration, the driving unit can be easily constructed.

In the driving unit according to the present invention, it is preferable that a material of a contact section of the driving direction-changing member in contact with the contact member is different from a material of other sections of the driving direction-changing member.

With this configuration, it is possible to independently select a material of the driving direction-changing member suitable for bonding the driving direction-changing member to the bendable displaceable member and a material of the driving direction-changing member suitable for the contact with the contact member.

The driving unit according to the present invention further comprises a driving circuit controlling the bending and displacement of the bendable displaceable member by supplying a voltage to the bendable displaceable member, the driving voltage supplied by the driving circuit having a rectangular waveform or a pulse-shaped waveform.

With this configuration, it is possible to control the driving direction of the driven body.

In the driving unit according to the present invention, the bendable displaceable member preferably includes piezoelectric material layers and a shim member.

With this configuration, it is possible to control magnetic field generation by the driving unit.

In the driving unit related to the present invention, the bendable displaceable member preferably includes two laminated piezoelectric material layers.

With this configuration, it is possible to increase an amount of the bending and displacement with respect to an applied voltage.

In the driving unit according to the present invention, the driven body preferably includes a lens.

With this configuration, it is possible to achieve a lens driving mechanism whose height is reduced.

The optical pick-up device according to the present invention includes the driving unit according to the present invention.

With this configuration, because the direction of the driving force caused by the bending and displacement of the bendable displaceable member is changed by the driving direction-changing member, the driven body is driven along a direction different from that of the bending and displacement of the bendable displaceable member. Because the driving direction of the driven body is different from the direction of the bending and displacement of the bendable displaceable member as a drive source, only a dimension in the driving direction of the bendable displaceable member needs to be considered when a dimension in the driving direction of the driving unit is determined. Therefore, in regard to the above-described configuration, in comparison to a conventional driving unit, it becomes possible to design the driving unit so that a dimension in the driving direction of the driving unit becomes smaller, thereby reducing the height of the driving unit. Further, because the driving direction-changing member and the precompression member mounted in the driven body are configured so as to be in contact with the contact member, it is possible to equalize the precompression before, during and after the driving. As a result, a long stroke drive can be achieved while height reduction can be achieved.

The present invention can be applied to a driving unit provided with a bendable displaceable member that is fixated at one end and, through electric control, bent and displaced at the other end, and to an optical pick-up device including the driving unit.

The embodiments and concrete examples of implementation described in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The invention claimed is:

1. A driving unit provided with a driving mechanism for driving a driven body, said driving mechanism comprising:
   a bendable displaceable member fixated at one end and, through electric control, bent and displaced at the other end;
   a driving direction-changing member changing a direction of the bending and displacement of the bendable displaceable member to a driving direction of the driven body, the driving direction of the driven body being perpendicular to the direction of the bendable displaceable member;
   a contact member frictionally engaged with the driving direction-changing member and driving the driven body; and
   a precompression member mounted in the driven body and carrying out precompression on the contact member towards the driving direction-changing member.

2. The driving unit of claim 1, wherein the driving direction-changing member includes a curved surface frictionally engaged with the contact member.

3. The driving unit of claim 2, wherein the curved surface of the driving direction-changing member is curved with respect to only a single axis, and the precompression member is in line contact with the contact member.

4. The driving unit of claim 3, wherein the single axis direction is perpendicular to the driving direction of the driven body.

5. The driving unit of claim 2, wherein the curved surface of the driving direction-changing member is hemispherical, and the precompression member is in surface contact with the contact member.

6. The driving unit of claim 1, further comprising a precompression adjusting mechanism for adjusting the precompression carried out by the precompression member.

7. The driving unit of claim 1, wherein a fixation section where the driving direction-changing member is fixated to the bendable displaceable member preferably includes a point where the displacement amount of the bendable displaceable member is maximal.

8. The driving unit of claim 1, wherein a material of a contact section of the driving direction-changing member in contact with the contact member is identical to a material of other sections of the driving direction-changing member.

9. The driving unit of claim 1, wherein a material of a contact section of the driving direction-changing member in contact with the contact member is different from a material of other sections of the driving direction-changing member.

10. The driving unit of claim 1, further comprising a driving circuit controlling the bending and displacement of the bendable displaceable member by supplying a voltage to the bendable displaceable member, the driving voltage supplied by the driving circuit having a rectangular waveform or a pulse-shaped waveform.

11. The driving unit of claim 1, wherein the bendable displaceable member includes a piezoelectric material layer and a shim member.

12. The driving unit of claim 1, wherein the bendable displaceable member includes two laminated piezoelectric material layers.

13. The driving unit of claim 1, wherein the driven body includes a lens.

14. An optical pick-up device including the driving unit of claim 1.

* * * * *